Nov. 3, 1953 — R. T. BURNETT — 2,657,592
FLUID TRANSMISSION

Filed Dec. 22, 1947 — 3 Sheets-Sheet 1

INVENTOR
RICHARD T. BURNETT
BY Cecil J. Arens
ATTORNEY

Nov. 3, 1953 R. T. BURNETT 2,657,592
FLUID TRANSMISSION
Filed Dec. 22, 1947 3 Sheets-Sheet 2

INVENTOR
RICHARD T. BURNETT
BY Cecil J Arens
ATTORNEY

INVENTOR
RICHARD T. BURNETT
BY
Cecil J Arens
ATTORNEY

Patented Nov. 3, 1953

2,657,592

UNITED STATES PATENT OFFICE 2,657,592

FLUID TRANSMISSION

Richard T. Burnett, South Bend, Ind., assignor to Bendix Aviation Corporation, South Bend, Ind., a corporation of Delaware Application December 22, 1947, Serial No. 793,233

8 Claims. (Cl. 74—677)

This invention relates to energy transmitting mechanisms and more particularly to such mechanisms embracing an infinitely variable hydrokinetic torque converter combined with gearing.

An important object of the invention is to provide a variable speed transmission for use in a vehicle with an internal combustion engine wherein a hydro-kinetic torque converter is utilized with the gearing to vary the torque ratio throughout a wide speed range of the vehicle in such a manner that, at stall or zero speed of the vehicle, the output torque is more than three times as great as the imput torque and as vehicle speed increases the torque ratio gradually diminishes until the output torque equals input torque at a vehicle speed above 50% of the top vehicle speed, when the engine is at full throttle, all of which takes place without clutching or shifting gears.

A very important object of the invention resides in the provision of a variable speed transmission for use with an internal combustion engine wherein a hydro-kinetic torque converter with overdriving turbine wheel is utilized with reduction gearing to thereby cause the output shaft speed to approach the input shaft speed at a high efficiency.

A further object of the invention resides in the provision of a hydro-kinetic machine interconnected with planetary gears which combine positive torque from turbine and reaction wheels after torque multiplication has ceased for driving an output shaft at a speed approaching input shaft speed.

A still further important object of the invention resides in the provision of a transmission including a hydro-kinetic torque converter in which a reaction wheel is held against rotation during torque multiplication and thereafter is driven in a direction tending to bring output shaft speed up to input shaft speed.

A yet further object of the invention is to provide a transmission having a hydro-kinetic torque converter and a torque multiplying device interconnected so that reaction is combined in a single means which includes a one-way brake.

Another important object of the invention lies in the provision of a fluid transmission for a vehicle powered by an internal combustion engine the speed of which is held low when the vehicle is stationary and gradually increases through the vehicle speed range up to the point where a one-to-one torque ratio is obtained.

The above and other objects and features of the invention will be apparent from the following description of the apparatus taken in connection with the accompanying drawings which form a part of this specification, and in which.

Figure 1:
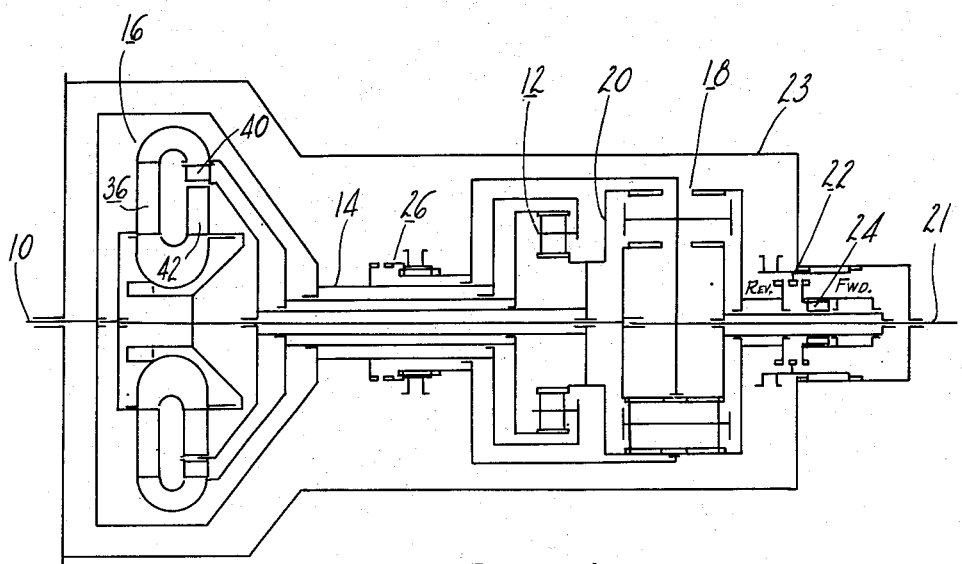
Figure 1 is a schematic diagram of one form of the invention.

Referring now to the schematic diagram of Figure 1 for a general description of the transmission of the invention, energy from an internal combustion engine (not shown) is impressed upon an input shaft 10 which is drivably connected to a power splitting differential gear set 12, through structure 14. The differential gear set divides the input power between an infinitely variable hydro-kinetic machine 16 and a torque multiplying planetary gear train 18. The torque from the hydro-kinetic machine or torque converter 16 is united in an element 20 with that portion of the torque transmitted from the differential to the planetary gear train as aforementioned. An output shaft 21 is directly connected to the planetary gear train 18 to receive the output torque thereof.

A device 22 for selecting forward or reverse drive is provided and is adapted to be connected to the torque multiplying mechanism or planetary gear train 18 and to a stationary structure or housing 23 which takes reaction from the planetary gear train and the hydro-kinetic torque converter. In forward drive, during torque multiplication, reaction is transferred to the housing through a one-way brake 24 which permits forward rotation only of the reaction member of the converter, that is, rotation in the same direction as the turbine. A clutch 25 is provided for connecting the output shaft 21 directly to the input shaft 10.

In reverse drive the torque to the output shaft is reversed. This is done by releasing that gear of the planetary gear train which was connected to the housing during forward drive and connecting another of the planetary gears to the housing. With this arrangement, the normally fixed member of the hydro-kinetic torque converter becomes the driven member while the turbine element becomes the fixed member.

Figure 2:
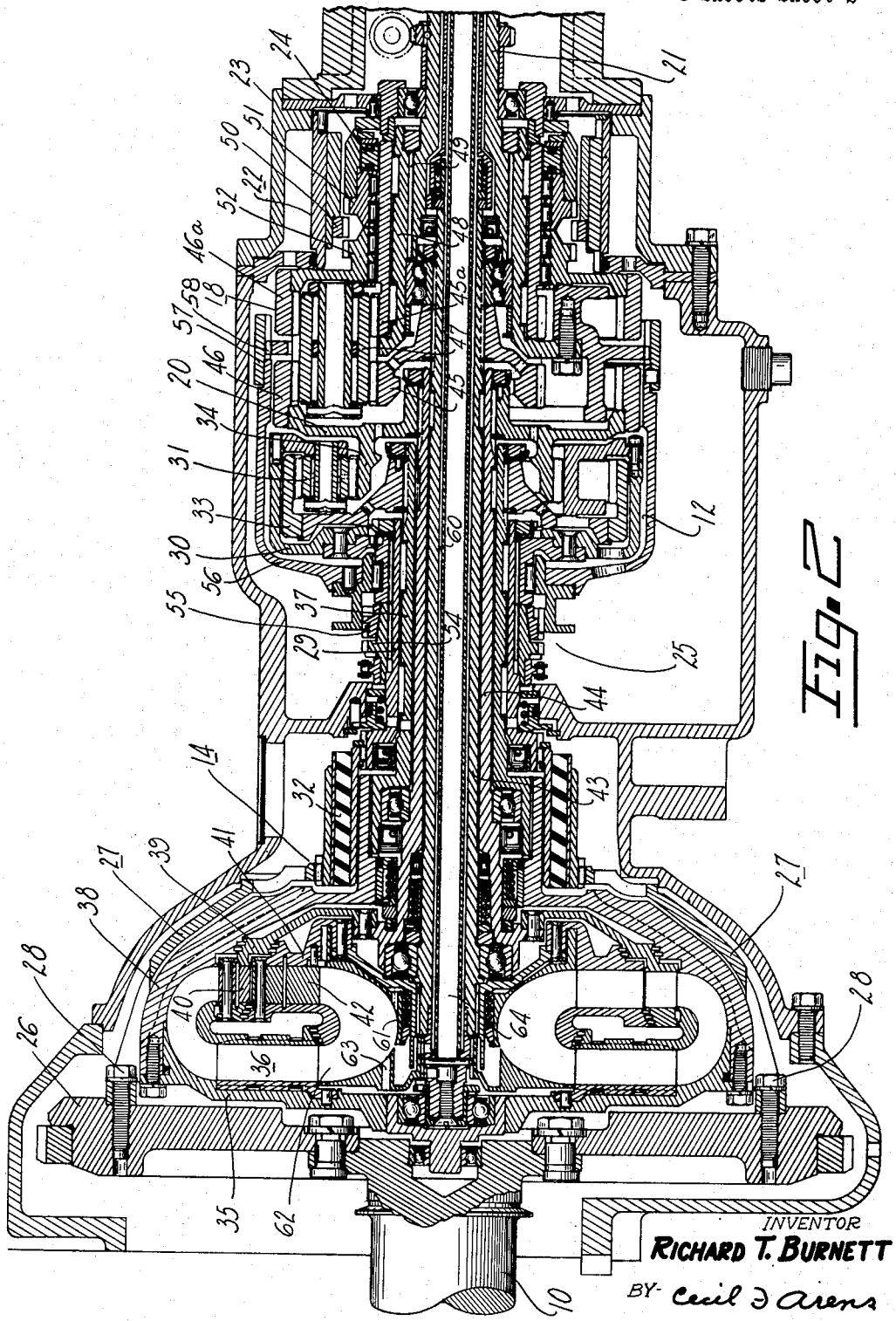
Figure 2 is a longitudinal section of the transmission of Figure 1.

Referring to Figure 2 for a detailed description of the invention, the drive shaft 10 is connected to the power splitting differential 12 by means of structure 14, which comprises a flywheel 26, a rotatable outer housing 27 secured to the flywheel by bolts 28, and a sleeve 29, on which is mounted a planet carrier 30, to which are secured planet pinions 31, of the power splitting differential. A coupling 32 is drivably interposed between the housing 27 and the sleeve 29.

The torque transmitted through the structure 14 is divided in the differential so that a portion of the torque is transmitted to ring gear 33 and the remainder to sun gear 34. That portion of the torque received by the ring gear is transmitted to an impeller wheel 35 having vanes 36. A sleeve 37 is splined to a rotatable inner housing 38, both of which are drivably interconnected to impeller wheel 35 for delivering power thereto from said ring gear 33. The sun gear 34 of the differential 12 is integral with the element 20 in which the torques from the differential and the hydro-kinetic machine are combined.

The hydro-kinetic torque converter 16 is claimed per se in my application on Torque Converter, Serial No. 701,595, filed October 5, 1946. The torque converter includes the impeller wheel 35 with blades 36, turbine wheel 39 with blades 40, said turbine wheel being mechanically connected to element 20, and a reaction or guide wheel 41 with blades 42, said reaction wheel being rigidly connected to a hollow shaft 43. The turbine wheel 39 is mounted on a tubular member 44, to one end of which element 20 is splined.

The torque multiplying planetary gear train 18 comprises sun gears 45 and 45a, the former of which is splined to the hollow shaft 43, ring gears 46 and 46a, the former of which is integral with the element 20, and double planet pinions 47 mounted on a planet carrier 48, which is securely fixed to the output shaft 21 by splines 49. The sun gears 45 and 45a are provided with an equal number of teeth and the ring gears 46 and 46a are likewise provided with an equal number of teeth. The planet pinions 47, only one of which is shown, are of uniform pitch diameters throughout their entire lengths. Although gears 45 and 45a are shown as two independent gears, their function in the gear train is the same as if the two gears were rigidly tied together. That is, since the double planet pinions 47 are the same pitch diameters throughout their entire lengths a one-to-one ratio is established between the gears 45 and 45a. With this relationship of one-to-one ratio between the pairs of sun and ring gears it is obvious that when one of the gears of a pair is fixed, the other gear of that pair must also be fixed.

For example, assume:

(1) That planet carrier 48 is stationary and sun gear 45a is free to rotate (that is, teeth 50 are not engaged with teeth 51); that gear 45 is rotating forwardly at 100 R. P. M.; that each of the sun gears has 30 teeth, and the pinion gear 47 has 15 teeth (two-to-one relationship). With this stated set of facts and under these conditions, the relative rotation of the gears will be as follows:

(a) Planet pinion 47 will rotate at 200 R. P. M.; and (b) Sun gear 45a will rotate forwardly at 100 R. P. M.

(2) That the relative speeds of planet carrier and sun gear 45 are maintained as in (1) above, except that the speed of each is reduced by subtracting 100 R. P. M. therefrom. Under this set of facts, the following observations were made:

(a) Since the planet carrier was fixed (zero speed in (1) above) subtracting 100 R. P. M. will cause the planet carrier to rotate −100 R. P. M., that is, the planet carrier will rotate in reverse;

(b) Since sun gear 45a was rotating forwardly at 100 R. P. M. in (1) above, it will now rotate at zero speed and may be considered fixed to the housing 23 through the teeth 50 and 51;

(c) Sun gear 45 will have zero speed as assumed above; and (d) Planet pinion 47 will rotate 200 R. P. M. with respect to the planet carrier.

To accomplish forward or reverse drive as aforementioned the device 22 is provided with a movable toothed member 50, selectively shiftable to the right to engage a toothed member 51, or to the left to engage toothed member 52. The toothed member 51 is drivably connected to the sun gear 45a through the one-way brake 24, which allows forward rotation only of this sun gear. Toothed member 52 is integral with the ring gear 46a. With toothed member 50 in mesh with toothed member 51 the transmission is established in forward operation. Reaction from the planetary gear set and guide wheel is taken through the sun gear 45a and the structure 23, via the one-way brake 24. With toothed member 50 in mesh with toothed member 52 the transmission is connected for reverse operation and the turbine wheel now becomes the reaction or fixed member, and the guide wheel becomes the rotating member. At this time torques from turbine wheel 39 and sun gear 34 of the differential gear are transferred through planet pinions 47 to the ring gear 46a, and negative torque from the guide wheel or reaction member is introduced through sun gear 45 into the torque multiplying planetary gear train and multiplied in the planet carrier with the reaction being taken in ring gear 46a, since the device 22 is now connected in reverse, so that member 50 intermeshes with member 52. Under these conditions with negative torque acting on the guide wheel 41, it is rotated in reverse thereby turning sun gear 45 in reverse which in turn will produce reverse rotation of the output shaft.

For connecting the output shaft 21 directly to the input shaft 10, the clutch 26 is interposed between the structure 14 and the planet carrier 48. A toothed member 54 is secured to the structure 14 for engagement with teeth 55 of an axially shiftable member 56. The axially shiftable member supports a ring like element 57 at one end, the member being formed interiorly to cooperate with teeth 58 of the planet carrier 48 to thereby drive the latter.

Fluid under pressure from a source, not shown, is supplied to the hydro-kinetic machine through a passage 60, around one end of ring valve 61 and thence into torus 62, where the fluid is circulated by the impeller blades 36. Passages 63 in the wall of the hydro-kinetic machine connect the torus 62 with a passage 64, in communication with a reservoir, not shown. The ring valve per se forms no part of the present invention but is described in detail and claimed in my application, Serial No. 745,463, filed May 2, 1947, now Patent 2,580,072.

Figure 4:
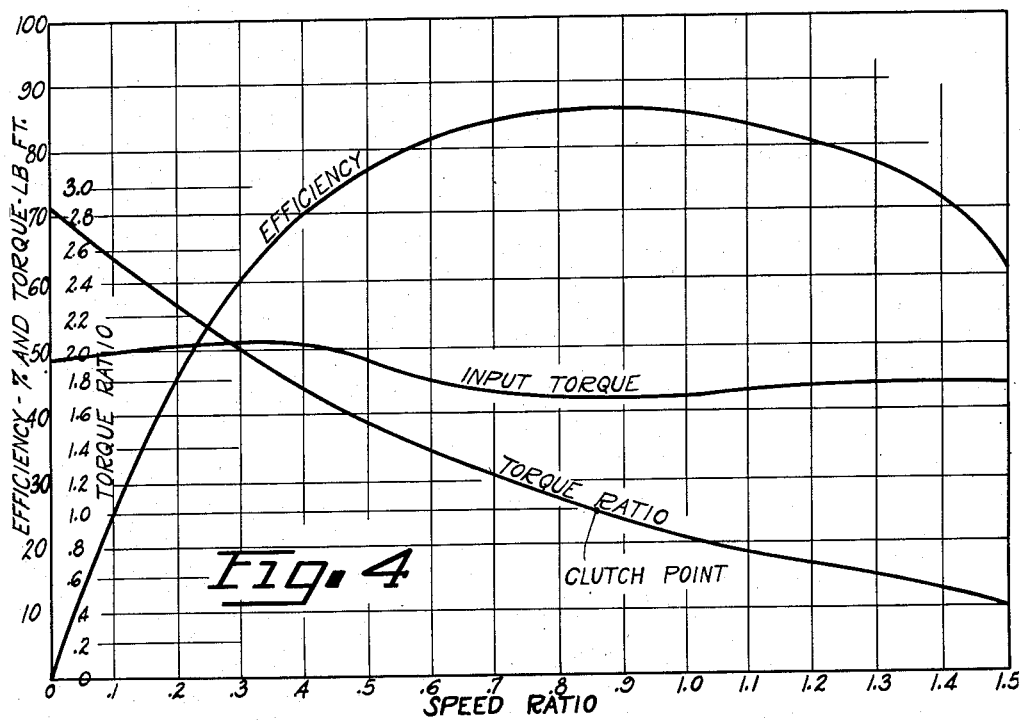
Figures 4 and 5 represent performance curves of the device of the invention.

With reference to Figure 4 it will be noted that the efficiency curve of the hydro-kinetic torque converter shows sustained operating efficiency over a comparatively wide range of speed ratio. The machine reaches a peak efficiency of approximately 86% at a time when the output shaft turns at 86% the speed of the input shaft and the torque ratio is one-to-one. Over a speed ratio range from 33 to 150 per cent the efficiency varies from 64 per cent at the lower speed ratio to 62.5 per cent at the higher speed ratio.

The "torque" and "R. P. M." of the various parts of the transmission are depicted on the curves of Figure 5. Torque is represented by the full line curves and R. P. M. by the broken line curves. Reaction is shown as negative torque. The reaction on the guide wheel is negative as long as the torque output of the converter is greater than torque input, that is, during torque multiplication of the converter. However, due to change in direction of fluid acting on the guide wheel the "guide wheel torque" curve crosses the abscissa changing from negative to positive torque. At this point, which may be referred to as the "clutch point" of the converter, the input torque on the impeller is equal to the output torque of the turbine. A vertical line A has been drawn through this point for ready reference to the condition of the elements of the transmission. Although the "guide wheel torque curve" crosses over the abscissa to thereby indicate a change from negative to positive torque, it will be remembered that the guide or reaction wheel is now only tending to rotate in the same direction as the turbine wheel since actual rotation of the reaction wheel is precluded by the fact that the combined reaction from the planetary gear set and differential is still being taken in the member 23 through the one-way brake 24 as indicated by the "reaction torque" curve. This reaction is due to torque multiplication in the planetary gear train 18. The guide or reaction wheel will not rotate forward until torque multiplication of the transmission ceases, as best shown by the intersection of the "guide wheel R. P. M." curve, with the abscissa. This may be defined as the "clutch point" of the transmission and a vertical line B is drawn therethrough for ready reference to the conditions of the other elements of the transmission at this point. Theoretically the output torque curve should cross the engine torque curve on line B.

Figure 3:
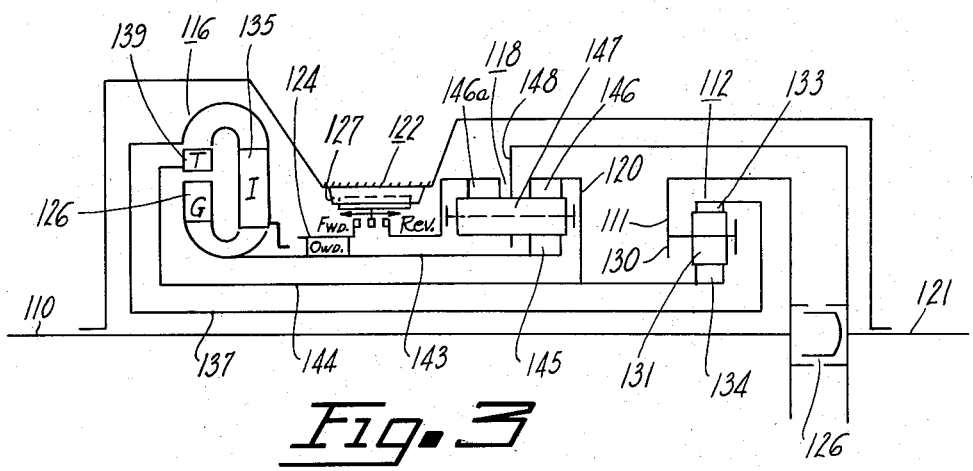
Figure 3 is a schematic diagram of a modified embodiment of the invention.

Figure 3 is a modified embodiment of the device in which the parts that are identical with those of the preferred embodiment will have the same reference characters plus 100. The driving member or input shaft 110 is centrally located interiorly of the transmission and the planetary gears are disposed in slightly different relationship to the hydro-kinetic machine as compared to the preferred form of invention of Figure 1. The shaft is drivably connected to a planet carrier 111 of a power splitting differential 112, which divides the power between an infinitely variable hydro-kinetic machine 116 and a torque multiplying planetary gear train 118. The torque from the machine 116 is united in member 120 with that portion of the torque transferred from the sun gear 134 of the differential to the ring gear 146 of the planetary gear train 118. An output shaft 121 is directly connected to the planet carrier 148 of the planetary gear train 118. For selecting forward or reverse drive, the transmission is provided with a device 122 arranged for connecting the guide wheel reaction member 126 of the converter and the sun gear 145 of the planetary gear train 118 with the fixed element or housing 127 through a one-way brake 124, or to connect the ring gear 146a of the planetary gear train to the housing 127. With respect to performance the modified embodiment is the same as the transmission of Figures 1 and 2.

Operation and function of the transmission:
With the input shaft 10 rotating and the device 22 in neutral position, as shown in Figures 1 and 2, there can be no torque reaction transmitted to housing 23. If the device 22 is now moved to forward drive position where teeth 50 and 51 are in engagement a negative torque reaction is now transmitted to housing 23. Immediately after the aforementioned engagement of the teeth torque will be imposed upon the output shaft which will begin to rotate when the torque reaches a value sufficient to overcome the load imposed. Before rotation of the output shaft occurs there exists a condition in the transmission commonly known as the "stall point." Input torque is divided in the differential 12 so that the greater portion passes into the ring gear 33 and the remainder is taken by the sun gear 34. The torque which passes into the ring gear 33 rotates impeller 35. The torque put into the impeller wheel is multiplied in the torque converter from whence it is transmitted via the turbine wheel to element 20 to be combined with that portion of the torque which is transmitted by the sun gear 34. This combined torque is impressed upon ring gear 46 of the planetary gear train 18, which further multiplies the torque and impresses it upon the planet carrier 48 splined to the output shaft 21. Reaction from the planetary gear train is taken by the sun gear 45a and transmitted to the housing through the one-way brake 24. Reaction from the torque converter is taken by the reaction wheel 41 and carried along the hollow shaft 43, sun gear 45, through planet gears 47, sun gear 45a, one-way brake 24, device 22, and thence into housing 23. At stall there is no relative rotation of the gears of the planetary gear train 18; and ring gear 33 of the differential is rotating at a speed 1⅔ greater than that of the planet carrier, and sun gear 34 has not yet begun to rotate.

Assuming a condition somewhere between stall and one-to-one converter torque ratio—a torque ratio of one-to-one is commonly termed the "clutch point"—the relative speeds of the gears of the differential will have changed considerably over the stall condition. The ring gear 33 will rotate at a speed higher than that of the planet carrier 30, which in turn will rotate at a higher speed than the sun gear 34. Ring gear 46 of the planetary gear train is also rotating at a relatively high speed compared to the planet carrier 48 with which the ring gear 46 is drivably connected. Of course, sun gears 45 and 45a are held fixed at this time by the one-way brake 24, to take the reaction from the converter and the planetary gear train. The reaction taken by the sun gear 45a is now somewhat less than at stall since the torque output has also diminished. That is, as the converter approaches its clutch point—one-to-one torque ratio—torque multiplication decreases until at the clutch point, torque input equals torque output. Because of internal losses in the converter its speed ratio does not reach one-to-one until after the clutch point (see Figure 5).

Figure 5:
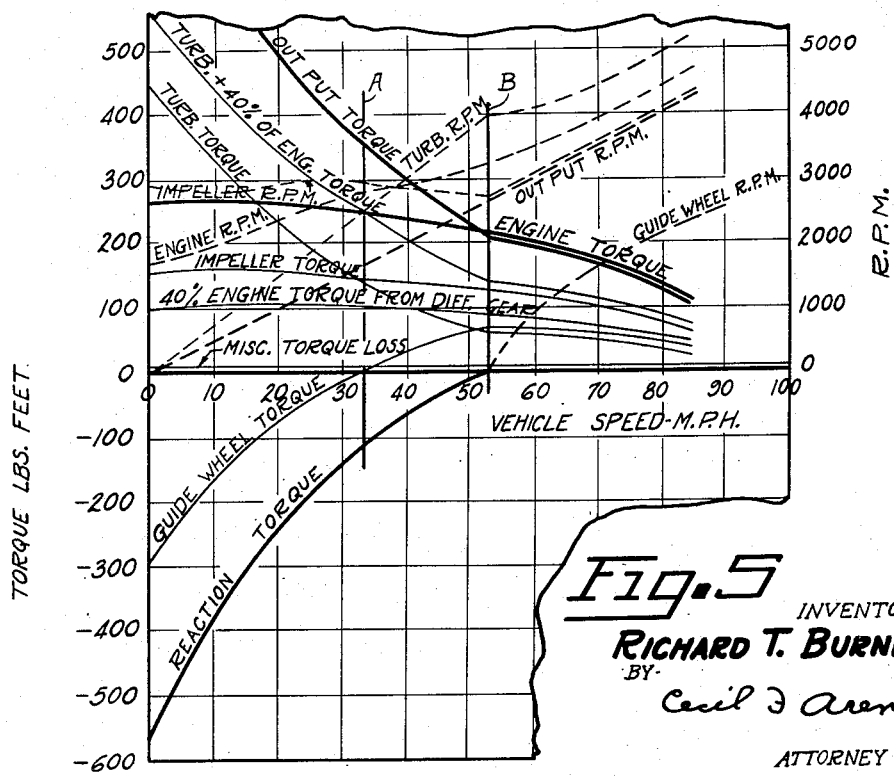

The arrangement of the differential in the transmission is such that it provides a rising engine speed characteristic, as best illustrated in Figure 5. It will be noted that at stall, that is, no forward vehicle speed, when engine R. P. M. is about 1690, the impeller R. P. M. is around 2900.

After the vehicle has attained a forward speed of 20 M. P. H., engine R. P. M. has risen to about 2400, and impeller R. P. M. has not changed appreciably. When the vehicle has reached a forward speed of approximately 37 M. P. H. engine and impeller R. P. M. are the same, as shown by the intersection of these two curves. At that time the turbine wheel is rotating at the same R. P. M. as the impeller, as indicated by the intersection of the turbine R. P. M. curve with the impeller R. P. M. curve. Obviously with such an arrangement engine speed at full throttle is relatively low at stall thereby minimizing unpleasant vibrations and enabling attainment of a high engine speed at the clutch point of the transmission to thereby provide torque multiplication throughout a wide range of vehicle speed. The differential also improves the efficiency of the transmission, since only a part of the horse power is hydraulically transmitted to the output shaft through the hydro-kinetic torque converter, with the remainder being transmitted mechanically to the output shaft with a minimum of losses.

Since the torque converter is handling only part, say 60% of the torque, and the impeller is overspeeding the input shaft at stall and the impeller torque capacity varies as the square of its speed, a much smaller torque converter can be used while holding the engine speed at a desirably low figure when the vehicle is stalled, than can be used without the two-path differential gear.

At the clutch point of the converter there is no longer reaction on the reaction wheel 42. The reason for this is that the circulating fluid from the impeller is now striking the reaction wheel at an angle which produces a balanced condition of moments acting on the reaction wheel. At the clutch point the only torque multiplication of the transmission comes from the planetary gear train 57 and consequently the only reaction taken in gear 45a results from torque on gear 46, in which is combined the torques from the turbine 39 and the sun gear 34. Beyond the clutch point of the converter—less than one-to-one torque ratio—the fluid circulated by the impeller acts on the reaction wheel to thereby tend to rotate the wheel in an opposite direction to which it tended to rotate during torque multiplication, that is, before one-to-one torque ratio. It will be remembered that before the clutch point was reached and during torque multiplication of the converter the one-way brake prevented the reaction wheel from rotating, however, beyond the clutch point and after the reaction on the reaction member has reversed the wheel is free to rotate except for the fact that the reaction taken from the planetary gear still is in the same direction as before and therefore holds the sun gears 45 and 45a fixed. In other words, the torque impressed on ring gear 46 rotates the pinions 47 in one direction, the reaction therefrom being taken in sun gear 45a, and the torque impressed on sun gear 45 by the reaction wheel tends to rotate the pinion in the opposite direction. Since the torque from the gear 46 is of a greater magnitude than the torque from the sun gear 45, the reaction taken by the one-way brake is in a direction which prevents rotation of sun gear 45a. The turbine wheel is now overdriving the impeller wheel.

As the transmission approaches its clutch point output torque decreases until at the clutch point output torque equals input torque, except for small miscellaneous losses such as bearing friction. Under these conditions the torques from the ring gear 46 and the sun gear 45 are balanced in the pinion 47 so that there is no reaction taken by the sun gear 45a. This combined action of ring gear 46 and sun gear 45 rotates the planet carrier at a speed which approaches input shaft speed to thereby establish a coupling action and a condition in the transmission conducive to locking the output shaft in direct drive with the input shaft.

With device 22 connected for reverse gear, teeth 50 and 52 are in meshing relationship. This means that ring gear 46a is now fixed to the housing 23 to take reaction. Ring gear 46, which is integral with sun gear 34, is also held against rotation. However, since sun gear 45a is now disengaged from the housing, sun gear 45, which is rotatably connected to guide wheel 42, can rotate in reverse to thereby drive the planet carrier in reverse, with an increase in torque in the planetary gear. It will be noted that during reverse drive the turbine wheel 40 becomes the fixed member since it is an integral part of gear 46, and the guide or reaction wheel 42 becomes the driven wheel.

Although only two embodiments of the invention have been illustrated and described, various changes in the form and relative arrangements of the parts may be made to suit requirements.

I claim:

1. A transmission comprising driving and driven shafts, a torque multiplying planetary gear trains having a planet carrier mounting pinions, a ring and two sun gears meshing with the pinions, said driven shaft connected to the planet carrier, an infinitely variable torque multiplying device connected to one of the sun gears, a differential gear set connected to said driving shaft and having a connection to said ring gear and to said device for dividing torque between said ring gear and device, and a one way brake connected to the other of said sun gears for restraining the same against rotation in one direction.

2. A transmission comprising driving and driven shafts, a torque multiplying planetary gear train having a planet carrier equipped with pinions rotatably secured thereto, a ring gear and two sun gears meshing with the pinions, the pinions and two sun gears being so related as to establish a one-to-one ratio between the sun gears, said driven shaft being connected to the planet carrier, a hydro-kinetic torque converter provided with impeller and turbine wheels and a reaction wheel the latter of which is so constituted that fluid acting thereon tends to rotate said reaction wheel in one direction during torque ratio greater than one-to-one in the converter and in an opposite direction when the torque ratio in the converter becomes less than one-to-one, a differential gear set including a planet carrier connected to the driving shaft, a ring gear connected to the impeller wheel and a sun gear interconnected with the turbine wheel and the ring gear of said planetary gear trains, means including a one-way brake connected to one of said sun gears for holding the reaction wheel against rotation during torque ratio greater than one-to-one between the input and output shafts and operative when the torque ratio between the shafts becomes less than one-to-one to permit said reaction wheel to be rotated in said opposite direction, the other of said sun gears being connected to said reaction wheel, and means for connecting the planet carrier of the planetary gear train to the input shaft for direct drive.

3. A transmission comprising driving and driven shafts, a planetary reduction gear set having a planet carrier with pinions rotatably secured thereto, a ring gear and a sun gear meshing with the pinions, said driven shaft drivably connected to the planet carrier, a hydro-kinetic torque converter provided with impeller and turbine wheels and a reaction wheel the latter of which is so constituted that fluid acting thereon tends to rotate said reaction wheel in one direction when the torque on the turbine is greater than the torque on the impeller wheel and in an opposite direction when the torque ratio between the turbine and impeller wheel is less than one-to-one, means connecting the driving shaft to the impeller wheel and ring gear for dividing torque between said impeller wheel and ring gear, and means including said sun gear for holding the reaction wheel against rotation when the torque on the driven shaft is greater than the torque on the driving shaft and operative when the torque ratio between said shafts is less than one-to-one to permit said reaction wheel to be rotated in said opposite direction.

4. A transmission comprising a hydro-kinetic torque converter provided with rotatable bladed impeller and turbine wheels, and a bladed reaction wheel constructed and arranged to be held against rotation at times, torque multiplying gear means including sun, ring, and planetary gears, an output member drivably connected to said torque multiplying gear means, means interconnected with said torque converter and said torque multiplying gear means for dividing input torque between said impeller wheel and one of said gears, said one gear interconnected with the turbine wheel to thereby combine the torque therefrom with torque from the torque dividing means, and means interconnected with said reaction wheel and said torque multiplying means for taking reaction therefrom and to permit one way rotation of said reaction wheel.

5. A transmission comprising a hydro-kinetic torque converter having bladed impeller wheel, turbine, and reaction wheels, reduction gear means including a planet carrier with pinions mounted thereon, a pair of ring gears and a pair of sun gears all arranged in meshing relationship to said pinions, one of said pair of ring gears and one of said pair of sun gears constructed and arranged to be held at different times depending on whether reverse or forward drive is desired, a differential gear set interconnected with said impeller and the other ring gear of said pair of ring gears to divide input power between the impeller and said other ring gear, said latter ring gear interconnected with the turbine wheel, the other gear of said pair of sun gears being connected to said reaction wheel, means for selectively holding said one gear of either of said pair of ring or sun gears, and a one-way brake connected to said last named means when forward drive is selected.

6. In a transmission of the character described having input and output shafts, a hydro-kinetic torque converter comprising impeller and turbine wheels, a reduction gear set having an element connected to the output shaft, a differential gear set having one element connected to the impeller wheel, a second element connected to the turbine wheel, and a third element connected to the input shaft, a connection from said second element to another element of the reduction gear set, and means for connecting said first-named element of the reduction gear set directly to the input shaft.

7. In a transmission comprising driving and driven shafts, a torque multiplying planetary gear trains having a planet carrier mounting pinions, ring and two sun gears meshing with the pinions, said driven shaft connected to the planet carrier, an infinitely variable torque multiplying device connected to one of the sun gears and to said ring gear, a differential gear set connected to said driving shaft and having a connection to said ring gear and to said device for dividing torque between said ring gear and device, and means connected to the other sun gear for restraining the same against rotation to thereby take reaction from said planetary gear train.

8. In a transmission comprising driving and driven members, a torque multiplying planetary gear train having a planet carrier mounting pinions, a connection from the driven member to the planet carrier, an infinitely variable torque multiplying device, a sun gear meshing with said pinions and having a connection to said device, a differential gear set connected to said driving member, a ring gear meshing with said pinions and having a connection to said differential gear set, a connection from said differential gear set to said device, and means for holding said sun gear against rotation in one direction.

RICHARD T. BURNETT.

References Cited in the file of this patent

UNITED STATES PATENTS

| Number | Name | Date |
|---|---|---|
| 2,235,370 | Jandasek | Mar. 18, 1941 |
| 2,280,015 | Tipton | Apr. 14, 1942 |
| 2,306,834 | Tipton | Dec. 29, 1942 |
| 2,312,849 | Pollard | Mar. 2, 1943 |
| 2,317,498 | Tipton | Apr. 27, 1943 |